Figure 1:
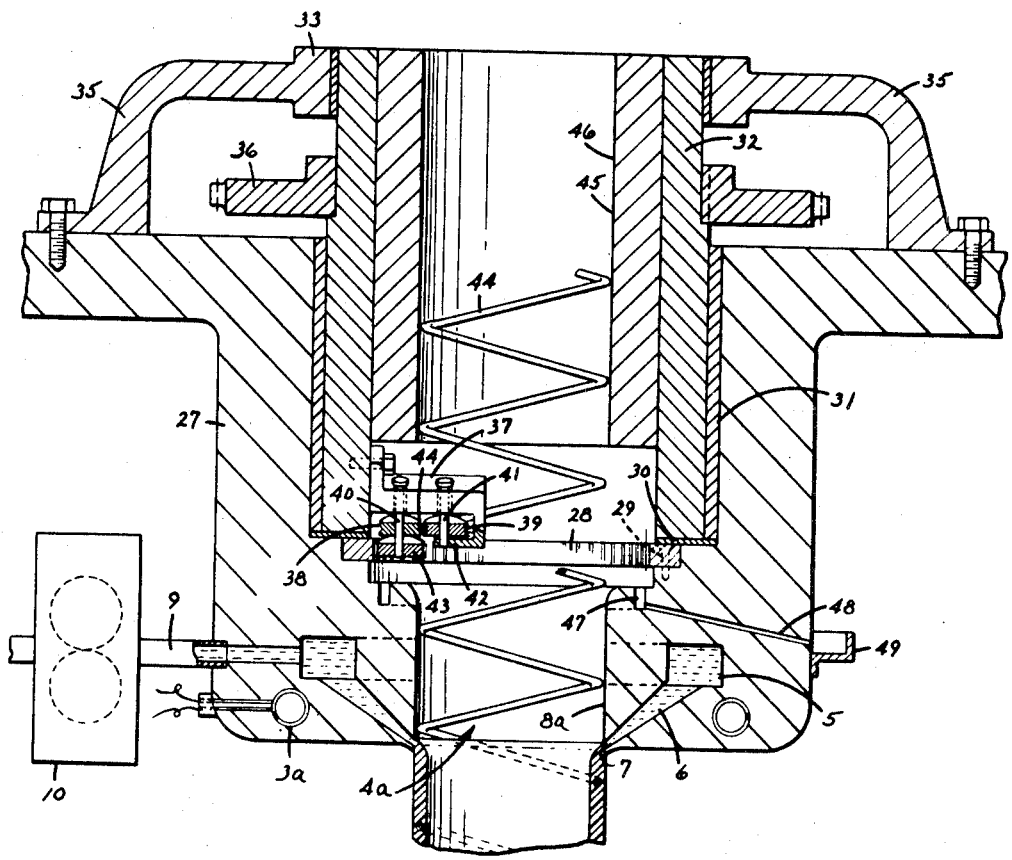

Feb. 5, 1957  C. A. CASTELLAN  2,779,971
APPARATUS FOR PRODUCING REINFORCED TUBING
Filed July 12, 1955

United States Patent Office 2,779,971
Patented Feb. 5, 1957

2,779,971

APPARATUS FOR PRODUCING REINFORCED TUBING

Carl A. Castellan, Delaware County, Pa., assignor to American Viscose Corporation, Philadelphia, Pa., a corporation of Delaware Original application April 14, 1953, Serial No. 348,673, now Patent No. 2,730,761, dated January 17, 1956. Divided and this application July 12, 1955, Serial No. 523,909

2 Claims. (Cl. 18—13)

It is the primary object of this invention to provide an improved apparatus for forming reinforced flexible tubing in a continuous manner. The invention is particularly concerned with the continuous production of reinforced tubing by the continuous feeding in an axial direction of a helically coiled reinforcement, such as of wire or plastic, through a passage in a device for extruding around the reinforcement a plastic material adapted to form the wall of the tube.

In systems heretofore proposed for carrying out this type of procedure, the helically coiled reinforcement is fed to the tubing extrusion orifice by a rotary member having a helical groove within which the reinforcing helix is received. The rotation of the grooved member causes the helical reinforcement to advance axially but because of the sliding friction between the helices of the coil and the grooves in the rotary member, such axial feeding motion is accompanied by a severe twisting moment exerted upon the helix. This twisting action extends from the rotary member into and sometimes beyond the extrusion position and when released further on, such twist tends to distort the wall of plastic material within which the strained or twisted coil was embedded at the point of extrusion.

According to the present invention, means is provided for axially advancing the helical reinforcement without the exertion of a twisting moment upon the coil thereby avoiding the tendency to form a distorted tubular wall in the final product. In general, this is accomplished by providing means for axially advancing the helical reinforcement through its guiding channel or passage by a device which comprises means for substantially positively gripping a convolution of the coil. This gripping means preferably grips the wire or plastic transversely of its cross-section thereby preventing lengthwise sliding motion of the wire or plastic element of the coil relative to the gripping element or elements.

In the drawing, which is illustrative of the invention,

Figure 1 is a sectional elevation of the present invention.

As shown in Figure 1, the extrusion device 27 is provided with a chamber 5, passage 6, annular orifice 7 terminating in the wall 8a of a channel 4a. A plastic tube-forming material may be fed to the chamber 5 by means of a conduit 9 communicating therewith to which a supply of the plastic may be connected through a suitable pump diagrammatically shown at 10. The pump 10 is preferably of a positive displacement type, such as a gear pump, so that the plastic material may be fed to the extrusion device at any desired predetermined constant rate. A heating element is shown at 3a. The extrusion head 27 is provided with an annular recess, to the bottom of which an annular internal gear 28 is fixedly secured as by screws 29. A thrust bearing or washer 30 is received thereon and a bushing 31 is received above the washer 30. A hollow cylinder or sleeve 32 is rotatably mounted within the bushing 31 and an outboard bearing 33 carried in suitable brackets 35 connected to the extrusion head or supporting frame therefor. A sprocket 36 is secured to the cylindrical member 32 for rotating it. Upon the inside wall of the cylindrical member 32, a bracket or arm 37 is secured and on this bracket a pair of rotors 38 and 39 are mounted on the shafts 40 and 41. As shown, the shaft 41 may extend through an outer arm 42 extending from the bracket 37. The outboard end of shaft 40 carries a gear 43 which is in mesh with the annular gear 28. The rotors 38 and 39 preferably have concavely-curved peripheries adapted to embrace the wire 44. If desired, the peripheries of these rotors may be of rubber to provide better gripping action. An additional sleeve 45 may be secured within the cylinder 32 to provide an internal guiding wall 46 of the same diameter as the wall 8a to serve as a guide for the helical reinforcement proceeding to the gripper device comprising rotors 38 and 39. An annular groove 47 may be provided to catch any oil draining from the ring gear 28 and a bore 48 extending through the extrusion head wall directs such oil to a collecting vessel 49 secured to the outer wall from which it can be readily removed.

The extrusion system of Figure 1 may receive the reinforcing coil from a supply receptacle and discharge the extruded tube to supporting and advancing systems and into a collecting device of any suitable and convenient construction. If needed, coagulating means, such as jets of cool fluid, may be played against the tubing as it leaves the extrusion system.

In the operation of the system, the size of gears 28 and 43 are so correlated with respect to the diameter of the driven roll 38 as to cause linear advance of wire 44 by the rolls 38 and 39 a distance equal to the length of one coil of the helix during a single revolution of the member 32. The angle of helix being herein defined as the angle between the tangent to the helix and the generatrix of the cylinder within which the helix is located. In other words, the rotary means 38 and 39 is driven at a rate to feed the element of the helix at a rate substantially equal to the quotient obtained by dividing the rate of rotation of the point of engagement between the element and the rotary means about the axis of the channel by the sine of the helix angle. When so constructed, there is no twisting component imparted to the helix but it is advanced a single pitch of the reinforcement coil during one revolution of the cylindrical member 32 and such advance is strictly uniform and in an axial direction. This strict axial motion results because the axis of shaft 40 lies in a plane which is parallel to the axis of the channel 4a but inclined out of parallel to such axis by an angle complementary to the angle of helix and the rotation of cylinder 32 about the axis of the channel 4a causes the point of gripping between the wire 44 and the nip rolls 38 and 39 to move in a plane that is at right angles to the axis of the channel 4a.

While the device is disposed to discharge the extruded tubing downwardly, it may be disposed to discharge it vertically upwardly or at any inclination to the vertical including a generally horizontal direction. However, the action of gravity favors the dispositions shown and less difficulty is encountered in producing tubing of substantially uniform wall thickness with this arrangement. The system of Figure 1 is particularly adapted to produce the larger sizes of cylindrical reinforced tubing.

The system of the present invention is adapted to produce reinforced tubing in a continuous manner from all sorts of plastic materials, such as vinyl resins, thermosetting resins, elastomeric polymers such as rubber, synthetic rubbers or the like, polyethylene, nylon, cellulose solutions and derivatives, such as solutions of cellulose esters in volatile solvents, including cellulose acetate, also cellulose ethers, such as ethyl cellulose, hydroxyethyl cellulose and carboxymethyl cellulose. The helical reinforcement may be formed of a wire of metallic or plastic material. It is preferably highly resilient so as to allow bending of the final tube when the walls thereof are of a flexible material or elastic material.

It is to be understood that changes and variations may be made without departing from the spirit and scope of the invention as defined in the appended claims.

I claim:

1. Apparatus for producing reinforced tubing comprising an extrusion device, an internal wall in the device defining a channel for receiving and guiding a coiled reinforcement element through the device, a discharge orifice extending circumferentially of the wall, rotary means adjacent the wall for positively gripping the element, a rotatable support for the rotary means, means for rotating the support about the axis of the channel, and means for driving the rotary means to feed the element therethrough at a rate substantially equal to the rate of rotation of the point of engagement between the element and the rotary means about the axis of the channel divided by the sine of the helix angle.

2. Apparatus as defined in claim 1 in which the rotary means comprises a pair of nip rolls for engaging the element and the means for driving the rotary means comprises a fixed annular gear and a pinion in mesh therewith connected to one of the nip rolls to rotate it.

No references cited.